US006538219B2

United States Patent
Poetter et al.

(10) Patent No.: US 6,538,219 B2
(45) Date of Patent: Mar. 25, 2003

(54) ARRANGEMENT FOR DETECTING IMPERMISSIBLY HIGH FORCES ACTING ON THE SUPPORTING STRUCTURE OF A VEHICLE

(75) Inventors: Jochen Poetter, Halstenbek (DE); Hubert Roeckendorf, Wedel (DE)

(73) Assignee: ESW-Extel Systems Wedel Gesellschaft fuer Ausruestung mbH, Wedel (DE)

( * ) Notice: Subject to any disclaimer, the term of this patent is extended or adjusted under 35 U.S.C. 154(b) by 0 days.

(21) Appl. No.: 10/014,420

(22) Filed: Dec. 11, 2001

(65) Prior Publication Data

US 2002/0092744 A1 Jul. 18, 2002

(30) Foreign Application Priority Data

Dec. 13, 2000 (DE) .......................... 100 62 528

(51) Int. Cl.$^7$ .............................................. H01H 35/00
(52) U.S. Cl. ..................................................... 200/61.08
(58) Field of Search ............................. 200/52 R, 61.08, 200/61.41, 61.42, 61.93, 300

(56) References Cited

U.S. PATENT DOCUMENTS

| 3,038,042 A | * | 6/1962 | Hall et al. ................. 200/61.08 |
| 3,335,371 A | * | 8/1967 | Yandell ........................ 455/98 |
| 3,553,587 A | | 1/1971 | Aass .............................. 325/114 |
| 3,853,199 A | * | 12/1974 | Hirashima et al. ........... 180/274 |
| 3,859,482 A | | 1/1975 | Matsui et al. ............. 200/61.08 |
| 3,936,621 A | * | 2/1976 | Palin et al. ............... 200/61.08 |
| 5,910,766 A | * | 6/1999 | Evans .......................... 340/539 |

FOREIGN PATENT DOCUMENTS

| DE | 36 22 708 | 1/1988 | .......... G01N/19/04 |
| EP | 0 319 051 A1 | 6/1989 | ........... B64C/25/00 |

* cited by examiner

Primary Examiner—Michael Friedhofer
(74) Attorney, Agent, or Firm—Reed Smith LLP

(57) ABSTRACT

An arrangement for detecting impermissibly high forces acting on a supporting structure of a vehicle is disclosed. Impermissibly high forces acting on the supporting structure of a vehicle which indicates possible damage to the supporting structure are detected within a predefined impact or deformation range only in the case of impermissibly high forces, by the disclosed an arrangement. This arrangement for detecting impermissibly high forces acting on the supporting structure of a vehicle comprises a housing which is deformable in a defined manner and essentially has the shape of a truncated cone, wherein the center axis of the truncated cone is oriented in the direction of the acting force to be detected, there is a rod with a wedge-shaped end provided in the interior of the housing, wherein the rod is rigidly fastened parallel to the center axis of the truncated cone to the base surface or top surface, electrical contacts inside a glass tube with a contact bridge keep a circuit closed, wherein the glass tube is oriented orthogonal to the direction of the rod and transverse to its wedge-shaped end, and when the height of the truncated cone is reduced due to the action of an impermissibly high force the rod and the glass tube are displaced relative to one another to the extent that the glass tube is broken and the contact bridge is interrupted.

20 Claims, 4 Drawing Sheets

ARRANGEMENT FOR DETECTING IMPERMISSIBLY HIGH FORCES ACTING ON THE SUPPORTING STRUCTURE OF A VEHICLE

CROSS-REFERENCE TO RELATED APPLICATIONS

This application claims priority of International Application German Application No. 100 62 528.2, filed Dec. 13, 2000, the complete disclosure of which is hereby incorporated by reference.

BACKGROUND OF THE INVENTION a) Field of the Invention

The invention is directed to an arrangement for detecting impermissibly high forces acting upon the supporting structure of a vehicle, particularly an impact sensor for detecting ground contact of the tail of an airplane.

b) Description of the Related Art

The problem of impermissibly high forces acting on a supporting structure and accordingly a plastic deformation that can result in a threat to the stability of the structure is relevant in many technical fields, primarily in vehicle engineering, but especially in aeronautics.

The critical, constantly recurring moments in an airplane are takeoff from the runway, in which the length of the runway, taxiing speed, wind and the ability of the pilot play a part, and landing on the runway in which additional factors come into play (such as descent speed, approach speed and approach direction in connection with wind and other climatic phenomena combined with the flying experience of the pilot). During these processes, the tail of the airplane touches down relatively frequently. What is of concern in this respect is not so much contact with the runway as such, but that a determined magnitude of force acting on the supporting structure of the airplane fuselage is not exceeded so that a threat to the stability of the supporting airplane structure can be reliably detected or excluded. In addition, because of the great number of loads occurring on an aircraft, a tail strike indicator of the type mentioned above should allow constant checking with respect to its proper functioning so as to dependably rule out the possibility that ground contact of impermissible magnitude is not indicated due to failure of the sensor.

A conventional solution for a tail strike sensor in an airplane provides for a closed sleeve at the underside of the tail of the airplane in which two closely spaced contact lugs close the contact of a signal circuit when the sleeve is bent, so that a warning light indicates ground contact. However, in this tail strike sensor, the magnitude of the impact force and the continuous functionality of the sensor can not be detected (or can not be determined easily, i.e., without disassembling the sensor).

OBJECT AND SUMMARY OF THE INVENTION

It is the primary object of the invention to find a novel possibility for detecting impermissibly high forces acting on the supporting structure of a vehicle which indicates possible damage to the supporting structure within a predefined impact or deformation range only in case of impermissibly high forces. Another special object is to realize a novel tail strike sensor for airplanes which permits a more reliable detection of ground contact of the tail of an aircraft. Further, it should be easier to check the functionality of the sensor.

According to the invention, these objects are met in an arrangement for detecting impermissibly high forces acting on the supporting structure of vehicles with a substantially conical housing and two electrical contacts which are arranged inside the housing and which close a signal circuit indicating deformation when the housing is deformed in that the housing is deformable in a defined manner and essentially has the shape of a truncated cone, wherein a center axis joining the centers of the base surface and top surface of the truncated cone is oriented in direction of the acting force to be detected, in that there is a spike or rod with a wedge-shaped end in the interior of the housing, wherein the rod is rigidly fastened parallel to the center axis of the truncated cone to a base surface or top surface, the electrical contacts are connected with one another within a glass tube, and a circuit is kept closed, wherein the glass tube is oriented orthogonal to the direction of the rod and transverse to its wedge-shaped end, and in that when the height of the truncated cone is reduced in excess of a determined amount due to the action of an impermissibly high force the wedge-shaped end of the rod and the glass tube are displaceable relative to one another to the extent that the glass tube is broken and the contacts are disconnected.

In particular for impact sensors with force acting in different possible directions, the top surface of the housing is curved. It is advantageous that the housing is a truncated cone with a substantially elliptical base surface and top surface in order to achieve greater stability in a preferred movement direction of the vehicle.

For aircraft and watercraft, the housing is advisably shaped as an oblique truncated cone with a rounded top surface which is inclined in the principal movement direction of the vehicle, resulting in a kind of fin shape which is aerodynamically advantageous and very stable at the same time.

The defined deformability of the housing having the shape of a truncated cone is achieved in that the permissible force acting without deformation of the housing is calculated by stability calculation by means of the finite elements method.

For reliable disconnection of the contact bridge in the glass tube in case of any housing deformation (e.g., with proportional shear deformation), a tubular sleeve is provided, into which the rod penetrates by its wedge-shaped end in an initial position (without deformation of the housing), wherein the sleeve is rigidly fastened to the base surface or top surface located opposite to the rod fastening and has a holder for the glass tube such that the center axes of the glass tube and the sleeve intersect one another orthogonally.

In an advantageous variant, the rod is rigidly fastened to the base surface of the truncated housing and the sleeve is rigidly fastened to the top surface of the truncated housing.

The housing is advisably completely filled with solid material in order to minimize any functional interference within the housing due to condensation water or external shocks or shaking without deformation of the housing. In this respect, it is advantageous that most of the housing facing the acting force to be detected is filled with a rubber-like substance, preferably silicon rubber, and the rest of the housing is completely foamed with a suitable expanding material.

A glass fuse is advantageously suitable as the glass tube forming the carrier for the contact bridge of the monitoring circuit. Another possibility for the contact-making glass tube is a double-ended light bulb. It has turned out to be particularly advantageous to use a cutoff switch type reed contact for the contact-making glass tube. This can advisably be achieved by means of a reed contact which is kept closed by providing a permanent magnet.

To enable continuous checking of the functionality of the impact sensor, the reed contact can be switched off by means of an accompanying electromagnet for checking functionality. If needed, another simple monitoring possibility advisably consists in switching off the reed contact by means of a permanent magnet which is positioned at the housing for checking functionality from the outside.

In problem cases where the impact sensor is also exposed to the risk of abrasion in addition to the impact effect (such as when an airplane grazes the runway at high speed), it is advisable to arrange a wire loop at the guide construction (sleeve) provided for the rod along the longitudinal dimension of the guide construction for detecting abrasion of the top surface of the housing, wherein the wire loop, shaped like a turning bend, is securely fastened to the top surface at a predetermined distance from the fastening point of the sleeve and is guided back in the opposite direction. In case of abrasion of the top surface of the housing, when the sleeve which is fastened therein is abraded down to the turning bend, the contact loop is accordingly interrupted and ensures that ground contact is indicated even without deformation of the housing in that a monitoring circuit is interrupted.

A wire loop of the kind mentioned above for detecting abrasion can preferably also be a connection line to a connection terminal of the contact-making glass tube which, in the same way, interrupts the same monitoring circuit as the glass tube. For secure fastening of the turning bend formed by the wire loop, this turning bend is advantageously guided through the jacket surface of the sleeve and sealed. The contact loop can optionally be guided outside the sleeve toward the turning bend and back inside the sleeve, or the turning bend is guided through to the other outer side of the sleeve.

The basic idea of the invention is based on the consideration that in impact sensors which have been used in airplanes up to the present time and which provide (one-time) indication of ground contact of the tail precisely when two electrical contacts are closed or opened by destruction of a surrounding rod, it is not possible after such an event to determine (without additional costly steps) whether the supporting structure of the airplane tail has sustained damage or not. Further, a conventional tail strike sensor can not be checked for functionality at regular (e.g., prescribed pre-flight) routine inspections. These problems are solved according to the invention with a housing which is deformable in a defined manner and a contact bridge which can be reliably destroyed when a force is exceeded. Said housing deforms only when there occurs an impermissibly strong shock (e.g., ground contact of the tail of the airplane) and, due to a reduction in its height (crumple or shear deformation), the contact bridge is destroyed by a rod and a monitoring circuit is interrupted. For this purpose, the housing comprises a material that is softer than the actual vehicle structure and is dimensioned by the finite elements method in such a way that it does not deform until after a determined force is reached. A threshold behavior of this kind in an impact sensor during collision is also important for any vehicle outside the aeronautics industry.

Through the use of a reed contact as a contact bridge protected within a glass tube, the impact sensor can be monitored for functionality at any time (cutoff function) in that it can be checked (opened) by applying an external magnetic field. In this way, it can be determined whether or not the impact sensor is still intact also when a slight (possibly visible) impact contact has occurred which has not led to a (sufficient) deformation of the housing.

By means of an arrangement of this kind according to the invention, it is possible to reliably indicate that a predetermined (impact) force on a supporting structure of a vehicle has been exceeded and at the same time to ensure the functionality of the arrangement when the permissible force has not been exceeded. An arrangement of this type which is outfitted with a reed contact can be used particularly at the tail of airplanes (as a tail strike indicator TSI) because, in addition to the fact that it can be continuously checked (e.g., during routine inspections before takeoff), it also allows a decision to be made after the occurrence of ground contact of the airplane tail as to whether ground contact has occurred without damage to the airplane structure.

The invention will be described more fully in the following with reference to an embodiment example.

DESCRIPTION OF THE PREFERRED EMBODIMENTS

Although the arrangement according to the invention is always referred to hereinafter as a tail strike indicator (TSI) relating to aircraft, the arrangement is also suitable for applications in general vehicle engineering because of its special triggering system for a defined acting force (essentially directed in one dimension) and because of its ability to be checked in a simple manner after a slight impact and is therefore expressly not to be limited to aircraft.

Figure 1:
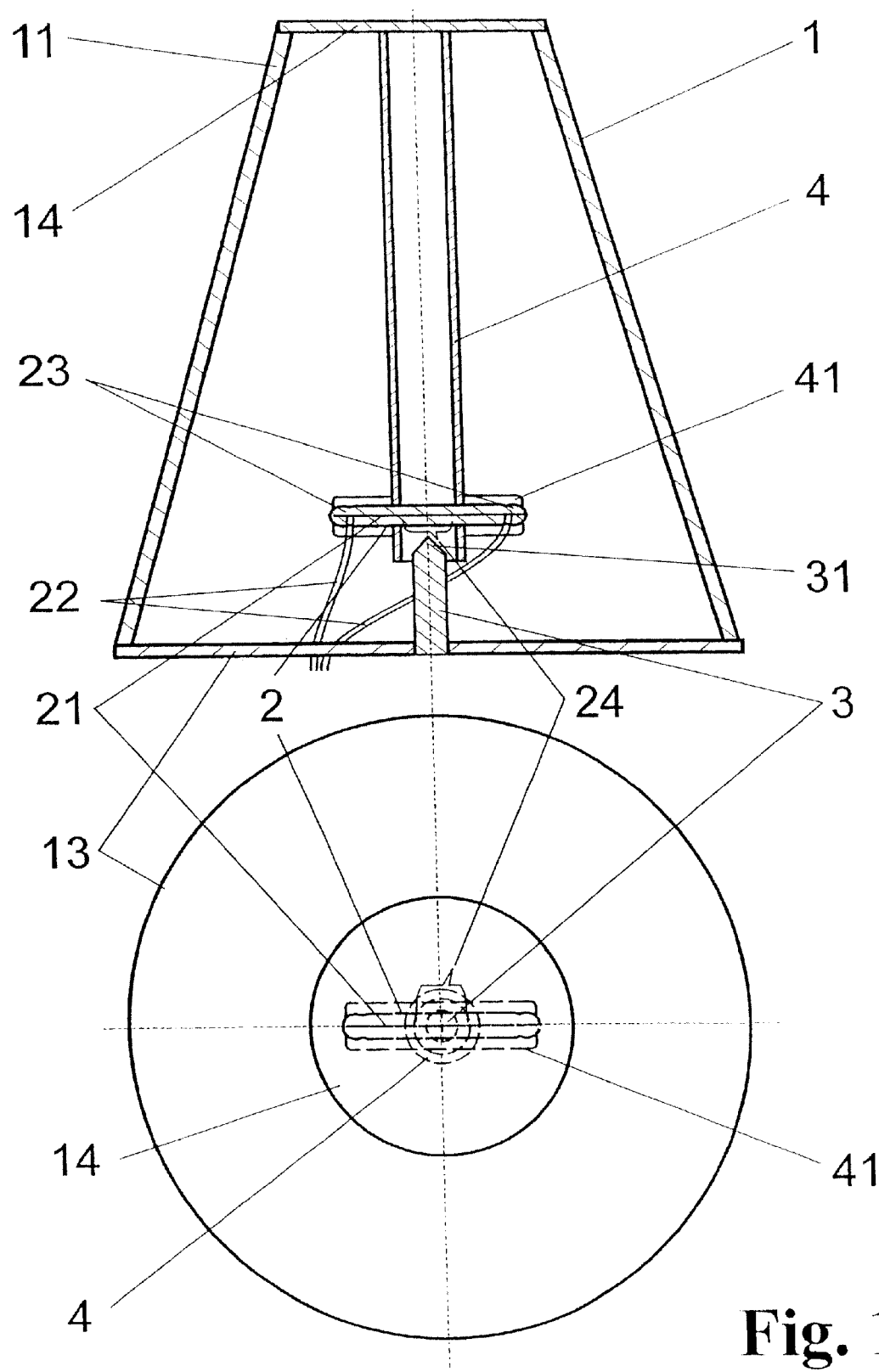
FIG. 1 is a sectional view from the top showing the basic construction of the arrangement according to the invention.

In its basic construction, the arrangement according to the invention comprises—as is shown in FIG. 1—a housing 1 which, in addition to the outer protective function, also provides, above all, a resistance function against permissible impact forces, a contact-making glass tube 2 by which a monitoring circuit of the sensor is kept closed, a rod 3, and a sleeve 4 which is a guide element favor the rod 3 and constitutes a holder for the glass tube 2.

The housing 1 comprises a material with good plastic deformability, e.g., a soft material such as aluminum, so that it deforms more easily than the supporting structure of a vehicle which is to be monitored reliably and continuously for impermissible loads. However, it could also be manufactured in a simple manner from the same material as the structural body, but with a correspondingly thinner wall. It is essential for the functioning of an impact sensor according to the invention that the housing 1 has the basic shape of a truncated cone in order to achieve a defined stability against an imperfectly vertical impact on the surface of the supporting structure to be protected.

The shape of the housing 1 is calculated, e.g., by means of the finite elements method (FEM), such that the housing 1 is plastically deformed only after a determined force has been exceeded. This force is always to be selected in such a way that it is still smaller than the permissible (safe)

maximum load of the supporting structure of the airplane. Since the force is expected to act substantially in one dimension from a predetermined direction, the housing is constructed as a truncated cone 11 as is shown in FIG. 1. The truncated cone is fastened by its base surface 13 to the structure to be protected (not shown). The force acts essentially orthogonal to the top surface 14 of the truncated cone 11, i.e., from the top with reference to the sectional view in the upper part of FIG. 1. Inside the truncated cone-shaped housing 1 along the axis of symmetry of the truncated cone 11, there is a rod 3 which is rigidly fastened to the base surface 13 and a sleeve 4 which is arranged at the opposite top surface 14. One purpose of the sleeve 4 is to keep the actual sensor element, the break sensor in the form of a contact-making glass tube 2, orthogonal to the rod 3. On the other hand, the sleeve 4 ensures that the rod 3 encounters the glass tube 2 without fail in case the top surface 14 is displaced in direction of the base surface 13 due to an impermissibly large force on the top surface 14. For this purpose, the sleeve 4 has a holder 41 in which the glass tube 2 is positioned orthogonal to the axis of symmetry of the truncated cone 11 in such a way that the ends 23 of the glass tube 2 are fixed—chiefly for purposes of a sure contact—and the middle area 24 of the glass tube 2 is exposed in the interior of the sleeve 4. The rod 3 penetrates into the open end of the sleeve 4 (already in the normal initial position) so that the sleeve 4 serves as a guide for the rod 3 in the direction of the middle area of the glass tube 2. When the base surface 13 and top surface 14 move toward one another, the rod 3 strikes the glass tube 2 and destroys it.

As will be seen from FIG. 1, the actual sensor element comprises a contact-making glass tube 2 which is incorporated in a monitoring circuit by means of an internal contact bridge 21 via connection lines 22 and keeps this monitoring circuit closed and functions as a breaker switch. This glass tube 2 is arranged in the truncated cone 11 (as the basic shape of the housing 1) in such a way that when the distance between the bottom and top surfaces 13 and 14 of the truncated cone 11, (i.e., the height of the truncated cone 11) is reduced beyond a predetermined amount, the glass tube 2 is destroyed and the inner contact bridge 21 is interrupted. This happens most effectively when the glass tube 2 is held parallel between the bottom surface 13 and top surface 14 rigidly relative to one of the two surfaces (the top surface 14 in the present example), while a rod 3 is fastened to the other surface (the bottom surface 13 in the present example) in such a way that it destroys the glass tube 2 when the bottom surface 13 and top surface 14 move toward one another.

The functional reliability of this principle is achieved in that the rod 3 is outfitted with a wedge-shaped end 31 which is oriented orthogonal to the longitudinal direction of the glass tube 2 and in that the wedge-shaped end 31 penetrates into a sleeve 4 in which the glass tube 2 is rigidly held relative to the top surface 14. In order that the rod 3 dependably fulfills its purpose of interrupting the contact bridge 21, its wedge-shaped end 31 is provided—at least on the surface—with an electrically insulating material.

The effective mechanism described above, which consists in interrupting a monitoring circuit by destroying a contact-making glass tube 2, can be realized by any (thin) contact bridges 21, e.g., glass fuses, double-ended light bulbs, reed contacts or other insulated conductive connections with glass-breaking characteristics.

Figure 4:
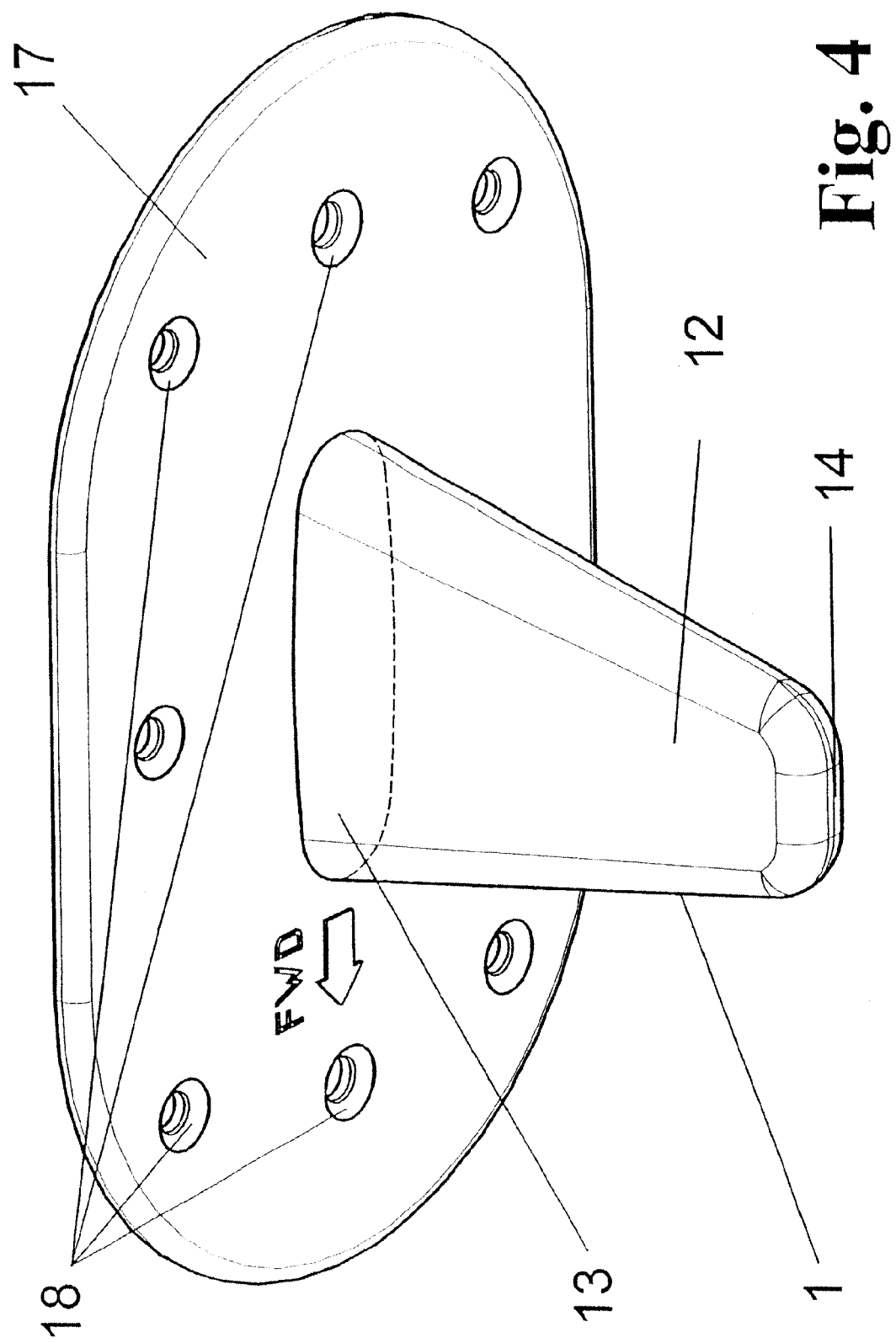
FIG. 4 shows an overall view of a tail strike sensor (TSI).

The housing 1 of a tail strike indicator TSI for an airplane has a somewhat more complex character because of the special type of load exerted on it. In order that the housing 1 is also protected against oblique impact or grazing contact (e.g., with the flight runway), the resistance against a force below which deformation of the housing 1 should not take place is better adjusted in that the truncated cone 11 is extended elliptically in the principal movement direction of the airplane. Stability is further improved by changing the truncated cone shape to an oblique truncated cone 11 or an oblique elliptical truncated cone 11 or—by curving or rounding the top surface 14—to a rounded fin shape 12 (as shown in FIG. 4). The projecting portions relative to a rotation-symmetric truncated cone 11 are oriented in the movement direction in order to increase resistance against shear deformation.

The housing 1 of a TSI is fabricated from a soft sheet metal which is initially pressed in a special shaping process to form a straight circular truncated cone 11 and is then transformed into a thin-walled fin shape 12 by means of a suitable shaping method similar to deep drawing in a plurality of work steps. The fin shape 12 is approximately an oblique elliptical truncated cone 11 whose geometric peculiarities are advantageous for the further description and do not conflict with the above-mentioned general principle of the truncated cone-shaped housing 1.

The thin housing wall which is formed by shaping achieves the deformability (stability limit) of the housing determined by the FEM calculations for a force input (including stabilization opposite to the principal movement direction of the airplane) which is directed essentially parallel to the center axis of the oblique elliptic truncated cone 11.

With compressive forces between approximately 1000 N and 2000 N during impact of the airplane fuselage on the runway, the housing 1 undergoes compression deformation to a greater or lesser extent, so that the height of the truncated cone 11, i.e., the (vertical) distance between the bottom surface 13 and the top surface 14, is reduced. When the height of the truncated cone is reduced beyond a preselected extent, the glass tube 2 serving as a breaker switch is irreversibly destroyed, the internal contact bridge 21 is severed and the hard ground contact is indicated in the cockpit. It can be detected, as a result, that the ground contact was critical for the supporting airplane construction and further inspection must be carried out. However, with the relatively soft, deformable housing 1, it is also ensured particularly with impact forces above 2000 N that no additional damage can be caused to the fuselage structure of the airplane due to the dimensional resistance of the housing 1 to its natural deformation, since the maximum force absorbed by the housing 1 (about 2000 N) is still appreciably below the critical boundary capacity of the airplane construction (which in this case has been predetermined at about 3600 N).

In order to realize a fully functional breaker switch, a reed contact 25 is used for the contact-making glass tube 2 in a TSI as is shown in FIG. 1. The reed contact 25 which is fastened in a holder 41 passes orthogonally through the sleeve 4 into which the rod 3 already penetrates slightly by its wedge-shaped end 31 in the initial position.

In case of impact deformation of the housing 1 (by force acting from below in this instance in the usual use position of a TSI), the sleeve 4 which is glued to the top surface 14 in the interior of the truncated cone 11 is pushed against the rod 3 and carries the reed contact 25 rigidly along with it against the rod 3. With a sufficiently large deformation (reduction in height of the truncated cone 11), breakage occurs and the reed contact 25 is severed. In this displacement process initiated by impact, the wedge-shaped end 31 initially penetrates the glass tube 2 and separates the contact tongues 26 of the reed contact 25 as it continues to push through. With respect to flight safety, the use of a reed contact 25 as a breaker switch has the decisive added advantage that its operation readiness (e.g., also after light ground contact) can always be checked.

Figure 2:
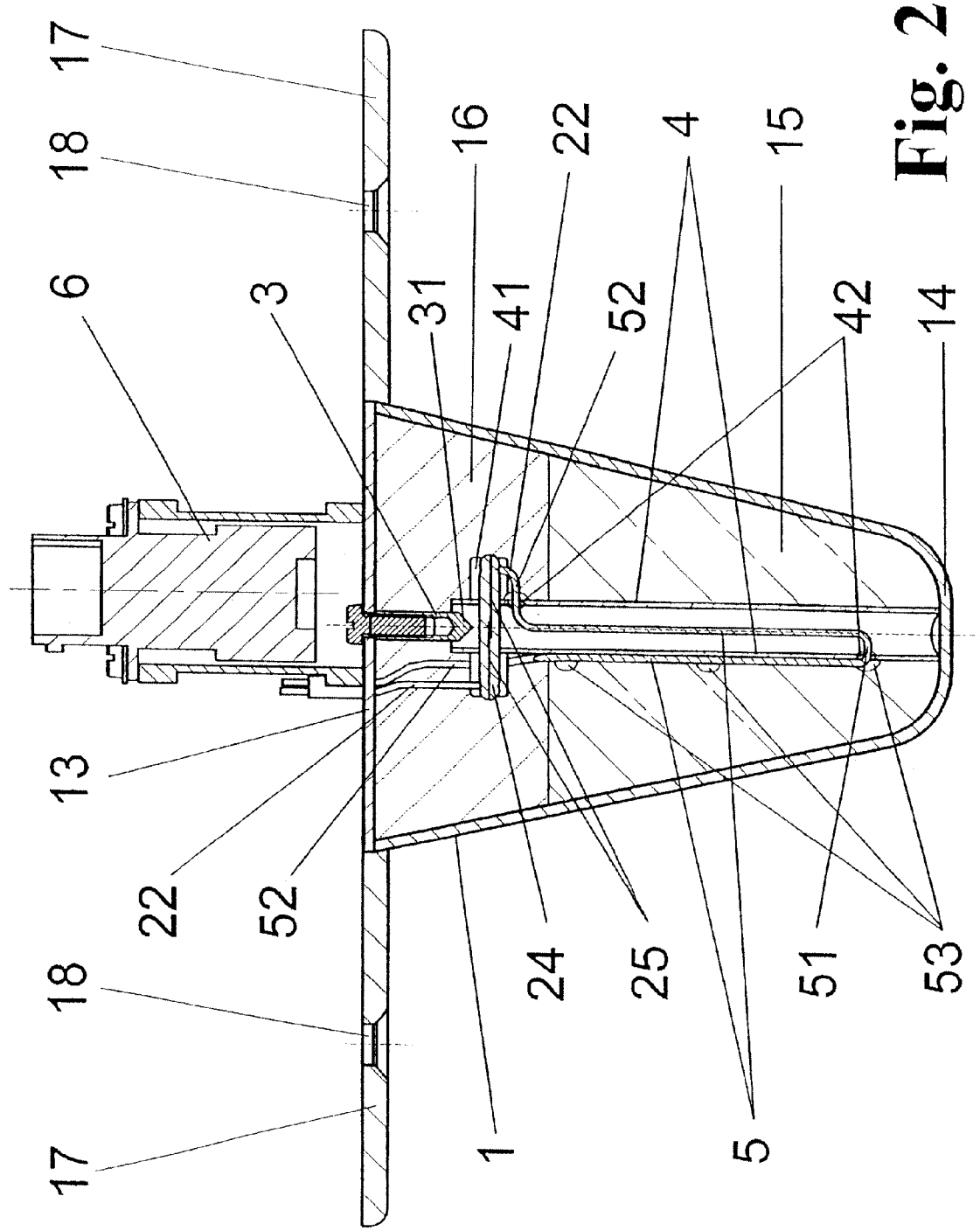
FIG. 2 shows a sectional view of a tail impact sensor for airplanes (tail strike indicator TSI)

In contrast to the usual function of reed contacts in which a circuit is connected by means of accompanying magnets, the switching function (cutoff) in the reed contact 25 shown in FIG. 2 is important solely for testing purposes. A reed contact 25 in the form of a cutoff in which an applied magnetic field opens the permanently closed contact tongues 26 is suitable for the testing function.

In addition, for detection of impact forces also in case of only light ground contact, i.e., when grazing the runway (with compressive forces below 650 N), and the consequent abrasion of the housing 1, the TSI for an airplane should send a signal to the cockpit. For this purpose, a wire loop 5 is arranged in the housing 1 parallel to the truncated cone axis so as to be fixed with respect to the housing in such a way that there is a distance of about 10 mm between the top surface 14 of the housing 1 and the turning bend 51 of the wire loop 5. FIG. 2 shows the simplest and at the same time most reliable possibility for this purpose in which the wire loop 5 is fastened along the sleeve 4 (which is fixed with respect to the top surface) and is guided through the wall of the sleeve 4 at a location determined for the turning bend 51 (e.g., 10 mm below the top surface 14). The turning bend 51 is accordingly unalterably defined as an abrasion point with respect to housing abrasion. In addition, the wire loop 5 is secured to the perforations 42 and to the wall of the sleeve by gluing in that it is sealed in places with dabs of plastic 52, e.g., epoxy. The wire loop 5 is a continuous connection line which—according to the construction in FIG. 2—functions as one of the connection lines 22 for the reed contact 25 and has an OR-switch function for its break-contact function. For this purpose, one end 52 of the wire loop is directly connected with the connector plug 6 and the second end 52 coming out of the sleeve 4 is connected with a contact tongue of the reed contact 25. In this case, only when a monitoring circuit coupled to the connection plug 6 is interrupted could a more exact investigation of the TSI provide information on whether the reed contact 25 is undamaged and the airplane structure is accordingly intact.

Figure 3:
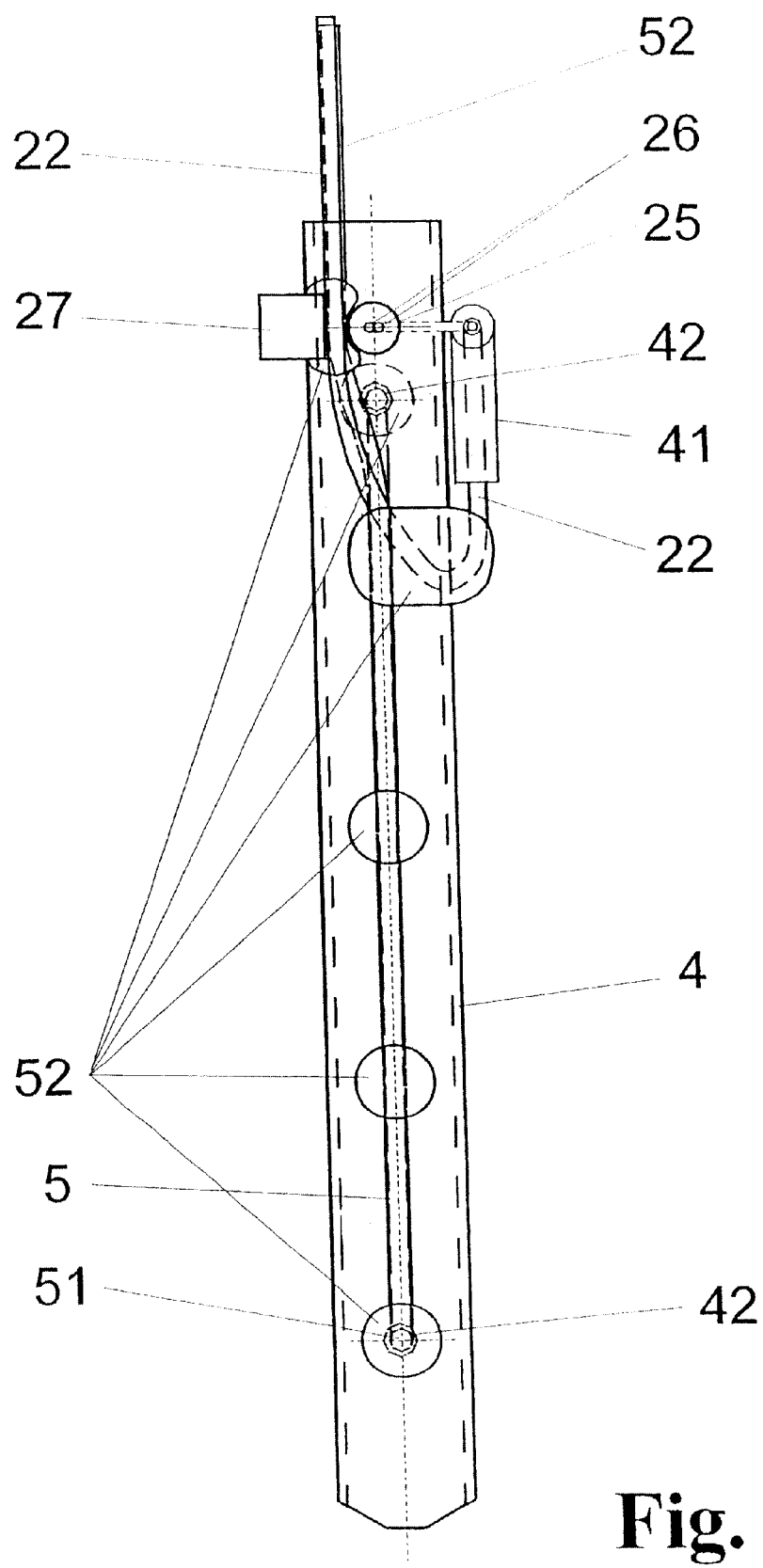
FIG. 3 shows an enlarged section of the sensor components in the interior of the housing with an additional wire loop for grazing contact.

FIG. 3 shows the interior of a TSI with a reed contact 25 in which the contact tongues 26 are always kept closed by a permanent magnet 27 in the normal operating position. In order to test this breaker switch and the signal processing means connected to it, the reed contact 25 can be opened temporarily by means of a magnet with a strength of about 1000 Tesla which is held on the outside against the housing 1 of the TSI. The same thing could be accomplished by means of an electromagnet (not shown) which is located in the housing 1 opposite the permanent magnet 27 and which can be switched on when needed.

In contrast to FIG. 2, the additional wire loop 5 is incorporated in a separate monitoring circuit independent from that of the reed contact 25 in that the ends 52 of the wire loop 5 are guided separately to the connection plug 6 provided for electrical coupling of the TSI. The same connection plug 6 also receives the connection lines 22 of the reed contact 25 and accordingly ensures the independence of the two sensor components (impact contact and abrasion contact). The connection lines are shown as double lines in the drawing.

When the housing 1 is abraded by more than 10 mm without the housing 1 otherwise experiencing a reduction in height by compression deformation, the wire loop 5 is severed at its turning bend 51 and a signal is generated in the cockpit. The actual breaker switch in the form of the reed contact 25 remains undamaged and accordingly indicates ground contact, which necessitates no further checking of the airplane construction. It is sufficient to exchange the TSI.

As is shown in FIG. 4, the TSI for airplanes has a fin shape 12 which is inclined in the direction of travel or flight and which can be described essentially by an oblique elliptical truncated cone 11 with a rounded top surface 14. For purposes of fastening to the airplane fuselage, the housing 1 is provided with a flange 17 which surrounds the bottom surface of the truncated cone-shaped housing 1 as an elliptical ring surface and is rigidly connected therewith (e.g., by welding). Fastening to the airplane tail is carried out through the bore holes 18 of the flange 17 by screwing it to the supporting structure (outer skin of the airplane fuselage). The TSI can accordingly be exchanged in a simple manner in case of a defect (e.g., due to ground contact).

The housing 1 of the TSI is completely closed and—as is shown in FIG. 1—is completely filled. It is filled with a silicon rubber 15 in the area of the break contact guide (sleeve 4 with holder 41 of the reed contact 25). The rest is foamed with a plastic compound of any type in order to prevent a displacement of the silicon rubber 15 in the housing 1 in case of impact on the one hand and in order to prevent the possibility of precipitation of condensation water at the inner wall of the housing on the other hand. Therefore, functionality is ensured above all under extreme conditions.

While the foregoing description and drawings represent the present invention, it will be obvious to those skilled in the art that various changes may be made therein without departing from the true spirit and scope of the present invention.

| | |
|---|---|
| 1 | housing |
| 11 | truncated cone |
| 12 | fin shape |
| 13 | base surface |
| 14 | top surface |
| 15 | silicon rubber |
| 16 | plastic substance |
| 17 | flange |
| 18 | bore holes |
| 2 | glass tube |
| 21 | contact bridge |
| 22 | connection lines |
| 23 | ends (of the glass tube) |
| 24 | middle area |
| 25 | reed contact |
| 26 | contact tongues |
| 27 | permanent magnet |
| 3 | rod |
| 31 | wedge-shaped end |
| 4 | sleeve |
| 41 | holder |
| 42 | perforation |
| 5 | wire loop |
| 51 | turning bend |
| 52 | ends |
| 53 | plastic dabs |
| 6 | connector plug |

What is claimed is:
1. An arrangement for detecting impermissibly high forces acting on a supporting structure of a vehicle comprising:
   a substantially conical housing;
   two electrical contacts being arranged inside the housing for connecting a signal circuit indicating deformation when the housing is deformed;

said housing being deformable in a defined manner and essentially having the shape of a truncated cone, wherein a center axis joining centers of a base surface and a top surface of the truncated cone is oriented in the direction of an acting force to be detected;

a rod having a wedge-shaped end in the interior of the housing, said rod being rigidly fastened parallel to the center axis of the truncated cone to one of the base and top surfaces;

said electrical contacts being connected with a contact bridge within a glass tube by which a circuit is kept closed, wherein the glass tube is oriented orthogonal to the direction of the rod and transverse to the wedge-shaped end thereof; and when the height of the truncated cone is reduced in excess of a determined amount due to the action of an impermissibly high force, the wedge-shaped end of the rod and the glass tube are displaceable relative to one another to an extent that the glass tube is broken and the contact bridge is interrupted.

2. The arrangement according to claim 1, wherein the housing is a truncated cone with a curved top surface.

3. The arrangement according to claim 2, wherein the housing is a truncated cone, wherein a permissible force acting without deformation of the housing is calculated by stability calculation by the finite elements method.

4. The arrangement according to claim 1, wherein the housing is a truncated cone with a substantially elliptical base surface and top surface.

5. The arrangement according to claim 4, wherein the housing is an oblique truncated cone with a curved top surface resulting in a fin shape which is inclined in the principal movement direction of the vehicle.

6. The arrangement according to claim 1, wherein a tubular sleeve is provided, into which the rod penetrates by the wedge-shaped end in an initial position, wherein the sleeve is rigidly fastened to the base surface or top surface located opposite to a rod fastening and has a holder for the glass tube such that the axes of symmetry of the glass tube and the sleeve intersect one another orthogonally.

7. The arrangement according to claim 6, wherein the rod is rigidly fastened to the base surface of the truncated cone and the sleeve is rigidly fastened to the top surface of the truncated cone.

8. The arrangement according to claim 7, wherein a wire loop is arranged at the sleeve along a longitudinal dimension for detecting abrasion of the top surface of the housing, wherein the wire loop, shaped like a turning bend, is securely fastened to the top surface at a predetermined distance from a fastening point of the sleeve and is guided back in the opposite direction.

9. The arrangement according to claim 7, wherein a wire loop is arranged at the sleeve along the longitudinal dimension for detecting abrasion of the top surface of the housing, wherein the wire loop is a connection line to a terminal of the contact-making glass tube, is securely fastened to the top surface at a predetermined distance from a fastening point of the sleeve in the form of a turning bend and is guided back in the opposite direction.

10. The arrangement according to claim 8, wherein the wire loop is guided through the wall of the sleeve and sealed for securely fastening the turning bend.

11. The arrangement according to claim 8, wherein the wire loop is guided outside the sleeve toward the turning bend and back inside the sleeve.

12. The arrangement according to claim 1, wherein the housing is completely filled with solid material.

13. The arrangement according to claim 12, wherein most of the housing which faces the acting force to be detected is filled with a rubber-like substance and the rest of the housing is completely foamed with a suitable expanding material.

14. The arrangement according to claim 13, wherein the rubber-like substance is silicon rubber.

15. The arrangement according to claim 1, wherein the glass tube is a glass fuse.

16. The arrangement according to claim 1, wherein the contact-making glass tube is a double-ended light bulb.

17. The arrangement according to claim 1, wherein the glass tube is a cutoff switch type reed contact.

18. The arrangement according to claim 11, wherein the glass tube is a reed contact which is kept closed by providing a permanent magnet.

19. The arrangement according to claim 11, wherein the reed contact can be switched off by an accompanying electromagnet for checking functionality. is guided outside the sleeve toward the turning bend and back inside the sleeve.

20. The arrangement according to claim 11, wherein the reed contact can be switched off by an external permanent magnet which is positioned at the housing (1) for checking functionality from the outside.

* * * * *